United States Patent
Brownworth

(10) Patent No.: US 9,148,865 B2
(45) Date of Patent: Sep. 29, 2015

(54) TECHNIQUES FOR IDENTIFICATION AND VALUATION USING A MULTI-POINT RADIO FINGERPRINT

(71) Applicant: Bandwidth.com, Inc., Raleigh, NC (US)

(72) Inventor: L. Anders Brownworth, Cambridge, MA (US)

(73) Assignee: BANDWIDTH.COM, INC., Raleigh, NC (US)

( * ) Notice: Subject to any disclaimer, the term of this patent is extended or adjusted under 35 U.S.C. 154(b) by 94 days.

(21) Appl. No.: 14/215,304

(22) Filed: Mar. 17, 2014

(65) Prior Publication Data

US 2015/0119031 A1    Apr. 30, 2015

Related U.S. Application Data

(63) Continuation-in-part of application No. 14/064,995, filed on Oct. 28, 2013, now Pat. No. 8,718,682.

(51) Int. Cl.

| | |
|---|---|
| *H04W 4/02* | (2009.01) |
| *H04W 88/06* | (2009.01) |
| *H04W 60/00* | (2009.01) |
| *G01S 5/02* | (2010.01) |
| *H04W 64/00* | (2009.01) |

(52) U.S. Cl.
CPC ........... *H04W 60/005* (2013.01); *G01S 5/0252* (2013.01); *H04W 64/00* (2013.01); *H04W 88/06* (2013.01)

(58) Field of Classification Search
CPC ................................ H04W 4/02; H04W 88/06
USPC .......... 455/456.1, 456.2, 456.3, 456.5, 456.6, 455/435.1, 552.1, 553.1
See application file for complete search history.

(56) References Cited

U.S. PATENT DOCUMENTS

| | | | | |
|---|---|---|---|---|
| 6,167,274 | A * | 12/2000 | Smith | 455/456.3 |
| 2003/0013460 | A1* | 1/2003 | Papadias et al. | 455/456 |
| 2007/0005367 | A1* | 1/2007 | DeJean et al. | 704/273 |
| 2007/0019586 | A1* | 1/2007 | Nanda et al. | 370/335 |
| 2007/0176741 | A1* | 8/2007 | Montenegro | 340/5.83 |

(Continued)

*Primary Examiner* — Christopher M Brandt
(74) *Attorney, Agent, or Firm* — Gregory Stephens

(57) ABSTRACT

Examples are disclosed for radio fingerprinting and for device identification and valuation using a multi-point radio fingerprint. In some examples radio fingerprinting logic may be operative for execution on a processor component to receive a set of radio frequency signals from multiple mobile computing devices at a first time, store identification information for the set of radio frequency signals, receive a subset of the set of radio frequency signals from one of the multiple mobile computing devices at a second time, associate identification information for the subset of radio frequency signals to the one mobile computing device, and generate a multi-point radio fingerprint for the one mobile computing device based on the subset of radio frequency signals. In other embodiments, radio fingerprinting logic may be operative for execution on a processor component to generate a multi-point radio fingerprint for a mobile computing device, the multi-point radio fingerprint comprising a generic identifier associated with a set of radio frequency signals output by the mobile computing device, receive device information for the mobile computing device based on identification information contained in one or more of the set of radio frequency signals, assign a device value to the mobile computing device based on the device information, and correlate the device value to the multi-point radio fingerprint. Other examples are described and claimed.

29 Claims, 13 Drawing Sheets

(56) References Cited

U.S. PATENT DOCUMENTS

| | | | |
|---|---|---|---|
| 2009/0254975 A1* | 10/2009 | Turnbull et al. | 726/3 |
| 2010/0093374 A1* | 4/2010 | Dacosta | 455/456.3 |
| 2011/0039580 A1* | 2/2011 | Wigren et al. | 455/456.1 |
| 2011/0065450 A1* | 3/2011 | Kazmi | 455/456.1 |
| 2011/0065453 A1* | 3/2011 | Baldemair et al. | 455/456.1 |
| 2011/0256853 A1* | 10/2011 | Gupta et al. | 455/414.1 |
| 2011/0306357 A1* | 12/2011 | Alizadeh-Shabdiz et al. | 455/456.1 |
| 2012/0269095 A1* | 10/2012 | Dalsgaard et al. | 370/255 |
| 2012/0289186 A1* | 11/2012 | Ayalur | 455/405 |
| 2013/0172007 A1* | 7/2013 | Wax et al. | 455/456.1 |
| 2013/0210485 A1* | 8/2013 | Nanda et al. | 455/552.1 |
| 2013/0288704 A1* | 10/2013 | Wirola et al. | 455/456.1 |

\* cited by examiner

*1000*

| Manufacturer | Model | Year Activated | Value |
|---|---|---|---|
| Apple | iPhone 5S | 2013 | 100 |
| Samsung | Galaxy S4 | 2013 | 90 |
| Motorola | Moto X | 2013 | 88 |
| Apple | iPhone 4S | 2011 | 75 |
| Samsung | Chrono 2 | 2010 | 40 |

> GENERATE A MULTI-POINT RADIO FINGERPRINT FOR A MOBILE COMPUTING DEVICE, THE MULTI-POINT RADIO FINGERPRINT COMPRISING A GENERIC IDENTIFIER ASSOCIATED WITH A SET OF RADIO FREQUENCY SIGNALS OUTPUT BY THE MOBILE COMPUTING DEVICE
> 1202

> RECEIVE VALUE INFORMATION FOR THE MOBILE COMPUTING DEVICE BASED ON IDENTIFICATION INFORMATION CONTAINED IN ONE OR MORE OF THE SET OF RADIO FREQUENCY SIGNALS
> 1204

> ASSIGN A DEVICE VALUE TO THE MOBILE COMPUTING DEVICE BASED ON THE VALUE INFORMATION
> 1206

> CORRELATE THE DEVICE VALUE AND THE MULTI-POINT RADIO FINGERPRINT
> 1208

*FIG. 12*

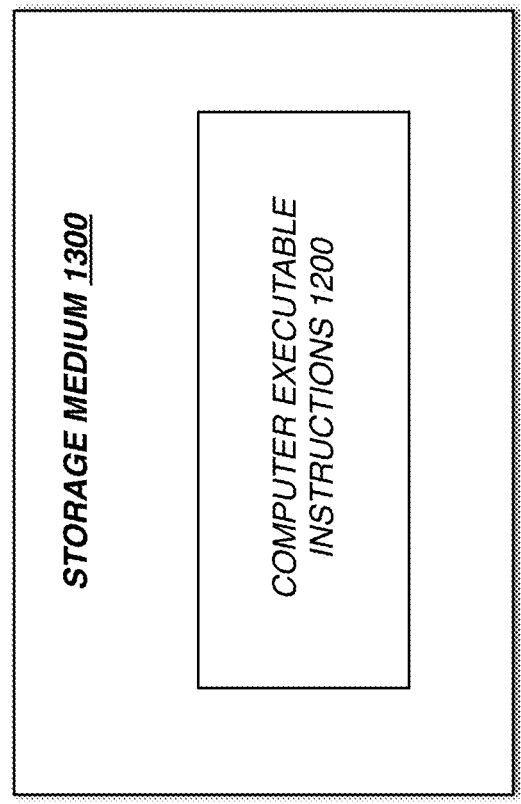

US 9,148,865 B2

TECHNIQUES FOR IDENTIFICATION AND VALUATION USING A MULTI-POINT RADIO FINGERPRINT

RELATED APPLICATIONS

This application is a continuation-in-part of and claims priority to U.S. patent application Ser. No. 14/064,995, filed Oct. 28, 2013, which is incorporated herein by reference in its entirety.

TECHNICAL FIELD

Examples described herein are generally related to techniques for device identification and valuation using a multi-point radio fingerprint.

BACKGROUND

Many mobile computing devices include multiple wireless communication capabilities utilizing a variety of wireless technologies such as Bluetooth® technology, wireless local area network (WLAN) using wireless technologies such as Wi-Fi™ and the like, cellular networks using wireless technologies such as GSM, CDMA and the like, and/or near field communication (NFC) technologies, etc. Each of these wireless technologies may include one or more identifiers associated with the mobile computing device and/or a radio of the mobile computing device corresponding to the respective wireless technology, however, current mobile computing devices and wireless networks do not include an efficient way to seamlessly link the identifiers for the different wireless technologies to the originating mobile computing device. Because it is common for a mobile computing device to have multiple radios associated with different wireless technologies active at any given time, it may be advantageous to correlate radio frequency signals and/or identification information for the radio frequency signals for different wireless technologies from a given mobile computing device for purposes of identification, tracking, etc. It is with respect to these and other considerations that the embodiments described herein are needed.

BRIEF DESCRIPTION OF THE DRAWINGS

FIG. 10 illustrates an example of database entries.

FIG. 12 illustrates an example of a third logic flow.

FIG. 13 illustrates an example of a second storage medium.

DETAILED DESCRIPTION

Figure 1:
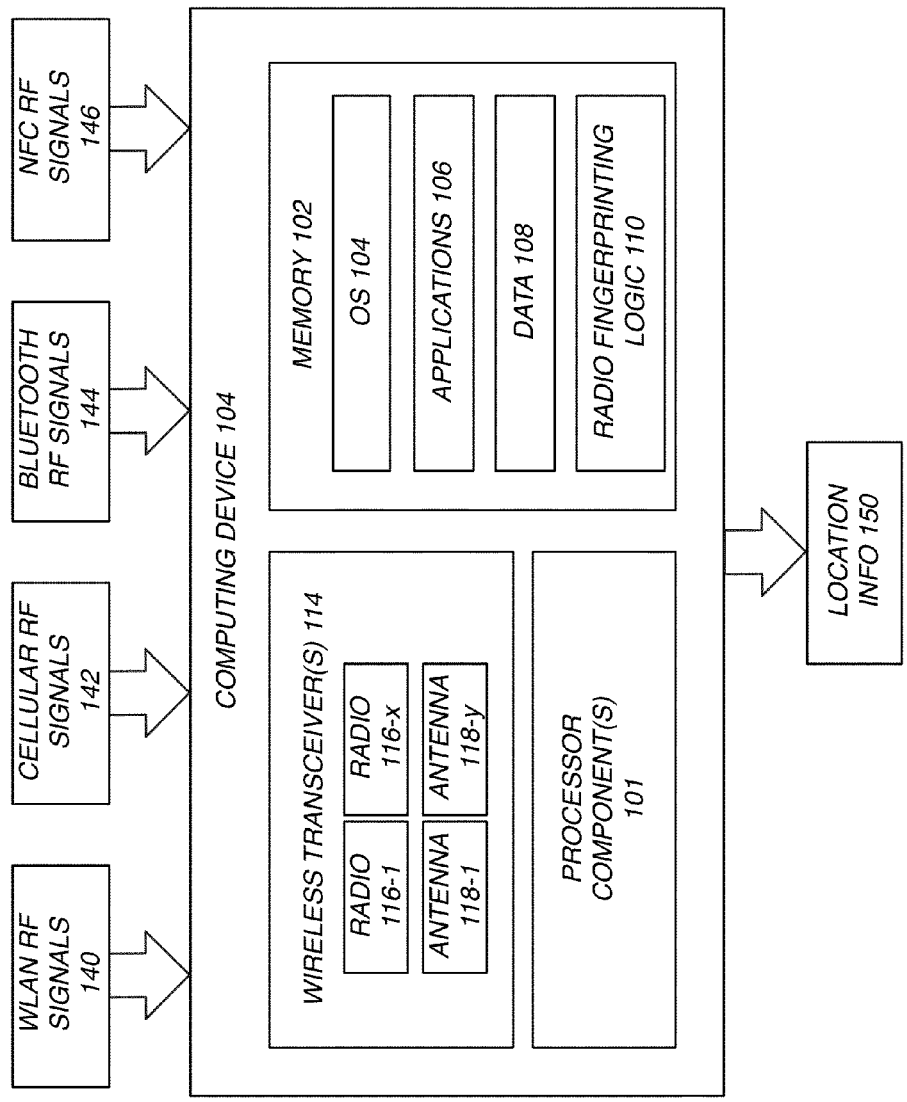
FIG. 1 illustrates an example block diagram for an apparatus.

Examples are generally directed to techniques for radio fingerprinting of mobile computing devices having wireless communication capabilities implemented using one or more wireless technologies or standards. These wireless capabilities may include establishing and/or maintaining wireless communication links and may also include wireless technologies suitable for use with wireless devices or user equipment (UE) capable of coupling to other devices via any suitable wireless technology. For example, mobile computing devices described herein may be configured to operate in compliance with various wireless technologies or standards including but not limited to Bluetooth® technology, standards and connections, WLAN standards such as those promulgated by the Institute of Electrical and Electronic Engineers (IEEE), cellular technology, standards and connections such as GSM or CDMA technologies, NFC technology, standards and connections, etc. The type and number of wireless technologies and standards descried herein are presented for purposes of illustration and not limitation. As such, any type and/or number of suitable wireless technologies or standards could be used and still fall within the described embodiments. In general, these wireless technologies may be operative to broadcast over a wide range of frequencies ranging from, but not limited to, 85 MHz-6 GHz. Different wireless technologies may utilize various portions of the aforementioned frequency range as one skilled in the art will understand.

In some examples, radio fingerprinting or radio frequency fingerprinting may comprise a process that identifies a device or signaler from which a radio transmission originated by looking at the properties of its transmission, including identification information in the transmission, specific radio frequencies of the transmission, etc. In some embodiments, radio fingerprinting may be used to group multiple radio transmissions or radio frequency (RF) signals originating from one mobile computing device to form a multi-point radio fingerprint. A multi-point radio fingerprint as described herein may be used to identify a mobile computing device based on detection of one or more of the RF signals originating from the mobile computing device that make up the multi-point fingerprint. For example, a multi-point radio fingerprint for a given mobile computing device may include a common identifier for identification information associated with RF signals originating from one or more of a Bluetooth® transceiver, a WLAN transceiver, a cellular transceiver and/or a NFC transceiver. This grouping of identifiers into a multi-point radio fingerprint may allow a base station or other detection device, receiver, etc. to identify a given mobile computing device at a number of different times, ranges, locations, etc. based on the capabilities of the respective wireless communication technology and information contained in the variety of RF signals. Other embodiments are described and claimed.

FIG. 1 illustrates a block diagram of an apparatus. As shown in FIG. 1, the apparatus includes an apparatus 100. Although apparatus 100 shown in FIG. 1 has a limited number of elements in a certain topology or configuration, it may be appreciated that apparatus 100 may include more or less elements in alternate configurations as desired for a given implementation. In various embodiments, the apparatus 100 may comprise a computing device 104 as shown in FIG. 1. In some embodiments, the computing device 104 may comprise a device capable of wired and/or wireless communication. The embodiments are not limited in this respect.

According to some examples, apparatus 100 may be part of a wireless device such as computing device 104 that may be capable of operating in compliance with one or more wireless technologies. While not limited in this respect, the computing device 104 may comprise a base station, server station, user equipment, a computer, a personal computer (PC), a desktop computer, a laptop computer, a notebook computer, a netbook computer, a tablet computer, an Ultrabook™ computer, a smartphone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

The apparatus 100 may comprise a computer and/or firmware implemented apparatus 100 having a processor component 101 arranged to execute instructions, modules, logic and/or one or more other components of apparatus 100. The processor component 101 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor component 101. The embodiments are not limited in this respect.

According to some examples processor component 101 may also be an application specific integrated circuit (ASIC) and other components of apparatus 100 may be implemented as hardware elements of the ASIC. Processor component 101 may be a single processing unit or a number of processing units, all of which may include single or multiple computing units or multiple cores. The processor component 101 may be implemented as one or more microprocessors, microcomputers, microcontrollers, digital signal processors, central processing units, state machines, logic circuitries, and/or any devices that manipulate signals based on operational instructions. Among other capabilities, the processor component 101 may be configured to fetch and execute computer-readable instructions or processor-accessible instructions stored in a memory 102 or other computer-readable storage media.

Memory 102 is an example of non-transitory computer-readable storage media for storing instructions to be executed by the processor component 101 to perform the various functions described herein. For example, memory 102 may generally include both volatile memory and non-volatile memory (e.g., RAM, ROM, or the like). Memory 102 may be referred to as memory or computer-readable storage media herein. Memory 102 is capable of storing computer-readable, processor-executable program instructions as computer program code that may be executed by the processor component 101 as a particular machine configured for carrying out the operations and functions described in the implementations herein.

Memory 102 may include one or more operating systems 104, and may store one or more applications 106. The operating systems 104 may be one of various known and future operating systems implemented for personal computers, audio video devices, mobile devices, smartphones, tablets and the like. The applications 106 may include preconfigured/installed and downloadable applications. In addition, memory 102 may include data 108 to store the installed and downloaded applications. In some embodiments, the data 108 may include or comprise RF signal identification information for use in generating and using a multi-point radio fingerprint as described elsewhere herein. The embodiments are not limited in this respect.

In various embodiments, the computing device 104 may include a wireless transceiver 114. Wireless transceiver 114 may include radios 116-x and antennas 118-y in some embodiments. It is worthy to note that "x" and "y" and similar designators as used herein are intended to be variables representing any positive integer. Thus, for example, if an implementation sets a value for x=3, then a complete set of radios 116-x may include radios 116-1, 116-2, and 116-3. The embodiments are not limited in this context.

The radios 116-x and antennas 118-y may comprise multiple radios and multiple corresponding antennas suitable for implementing multiple wireless communication technologies for computing device 104 in some embodiments. For example, computing device 104 may include separate radios 216-x and corresponding antennas 218-y for passively receiving WLAN RF signals 140, cellular RF signals 142, Bluetooth® RF signals 144, NFC RF signals 146 and/or location information 150 in various embodiments. The separate radios 116-x and/or antennas 118-y may be operative to implement a specific wireless communication technology or standard in some embodiments. In various embodiments, antennas 118-y may comprise one or more antennas, one or more antenna arrays or the like. The embodiments are not limited in this respect.

Memory 102 may include radio fingerprinting logic 110 in some embodiments. Radio fingerprinting logic 110 may be configured to generate a multi-point radio fingerprint for one or more mobile computing devices. For example, radio fingerprinting logic 110 may receive a set of radio frequency signals from the radios 116-x that are associated with multiple mobile computing devices at a first time, store identification information for the set of radio frequency signals, receive a subset of the set of radio frequency signals from the radios 116-x that are associated with one of the multiple mobile computing devices at a second time, associate identification information for the subset of radio frequency signals to the one mobile computing device, and generate a multi-point radio fingerprint for the one mobile computing device based on the subset of radio frequency signals.

In some embodiments, computing device 104 may be arranged to utilize a generic RF radio receiver as one of the radios 116-x. Such a generic RF radio receiver may comprise a Software Defined Radio (SDR). A SDR may comprise a radio communication system where components that may typically be implemented in hardware for a hardware radio system (e.g. mixers, filters, amplifiers, modulators/demodulators, detectors, etc.) are instead implemented by software on a computing device. In various embodiments, a basic SDR system may consist of a computing device equipped with a sound card, or other analog-to-digital converter, preceded by some form of RF front end. Significant amounts of signal processing are handed over to the general-purpose processor in a computing device having a SDR, rather than being done in special-purpose hardware as is done in a system with a hardware radio. Such a design produces a radio that can receive and transmit widely different radio protocols (sometimes referred to as waveforms) based solely on the software used. The embodiments are not limited in this respect.

The generic RF radio receiver may monitor and scan multiple commonly used frequencies to detect the presence and electronic signature of two or more mobile computing devices. For example, a passive SDR radio receiver of computing device 104 may monitor and record information about multiple mobile computing devices that pass within range of the computing device 104. Thereafter, patterns may emerge as to wireless device geo-traffic.

In an example embodiment, a mobile computing device may begin transmitting within an area using some set of technologies including but not limited to WiFi, Bluetooth, GSM Cellular, CDMA Cellular, and/or NFC. Computing device 104 may be listening in that area on a range of popular frequencies and may receive one or more of these RF signals and send them to the processor component 101. The processor component, via radio fingerprinting logic 110 for example, may attempt to match information associated with the received RF signals with known communication standards using those frequencies. The various communication standards make use of both static and dynamic identification information. For example, in the case of WiFi and Bluetooth®, a static MAC address is transmitted as a part of all communications from the device. In various embodiments, a multi-point radio fingerprint may be generated from the identification information from each technology and the information may be stored in memory 102 as data 108 for example.

The multi-point radio fingerprint of a device may include both static and dynamic (or temporary) identifiers. As the dynamic identifiers change over time, the static identifiers can be used to tie the new dynamic identifier back to the mobile computing device. For example, WiFi MAC addresses are typically static while GSM TMSI addresses are dynamic in nature. Over time, the GSM radio of a mobile computing device may change TMSI addresses but the associated static WiFi MAC address can be used to tie the new TMSI address back to the device and to update the multi-point radio fingerprint for that device. Generating the multi-point radio fingerprint may be challenging in environments where lots of devices are present, it is difficult to triangulate the location of a particular device, etc. It is with respect to these and other considerations that the embodiments described herein are needed.

The example computing device 104 described herein is merely an example that is suitable for some implementations and is not intended to suggest any limitation as to the scope of use or functionality of the environments, architectures and frameworks that may implement the processes, components and features described herein. Generally, any of the functions described with reference to the figures can be implemented using software, hardware (e.g., fixed logic circuitry) or a combination of these implementations. Program code may be stored in one or more computer-readable memory devices or other computer-readable storage devices. Thus, a computer program product may implement the processes and components described herein.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. Apparatus 100, computing device 104 and radio fingerprinting logic 110 may be better understood with reference to the figures and examples that follow.

Figure 2:
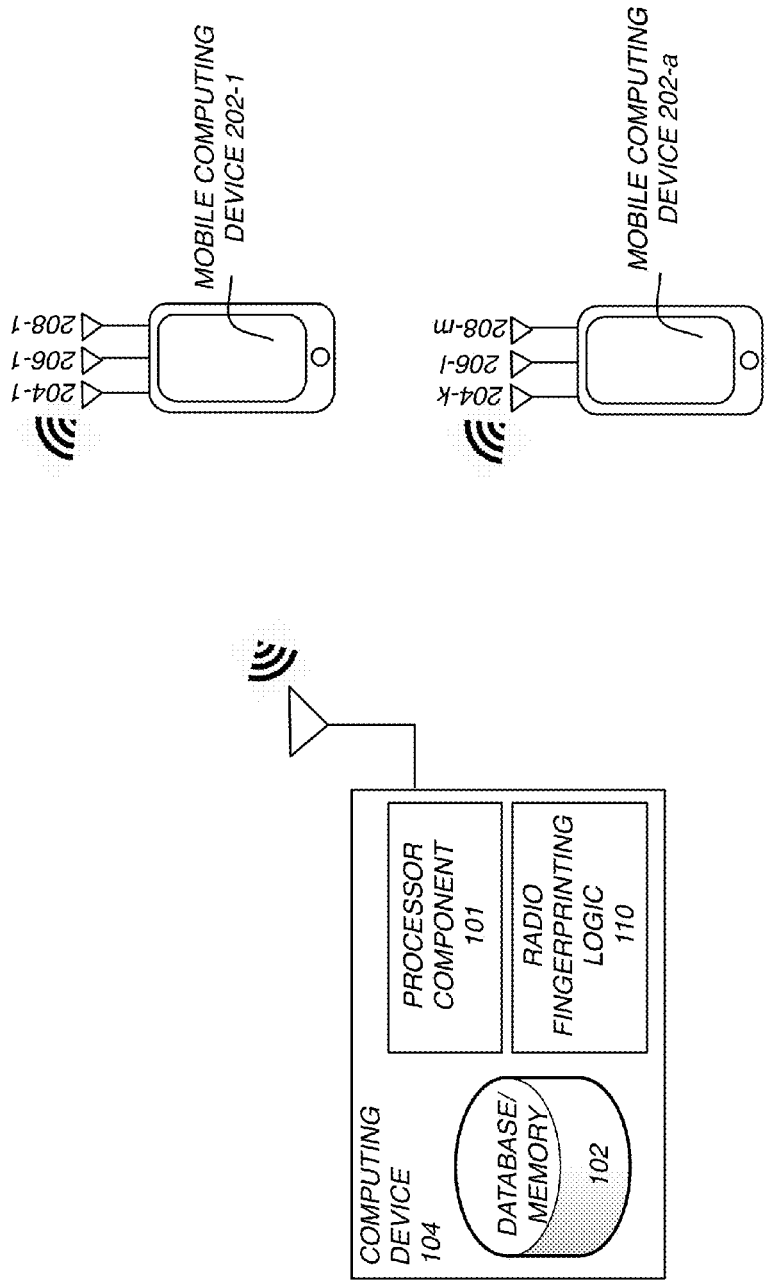
FIG. 2 illustrates an example block diagram for a first system.

FIG. 2 illustrates a system-level overview of a first example system 200 for implementing radio fingerprinting. In various embodiments, the system 200 may include a single computing device device 104 and one or more mobile computing devices 202-a. In one embodiment, the station device 104 may comprise a base station and may be the same or similar to the computing device 104 of FIG. 1. The mobile computing devices 202-a may comprise any suitable mobile computing device having wireless communications capabilities including but not limited to two smartphone devices as shown in FIG. 2.

While not shown in FIG. 2, station device 104 may include an array that may include one or more antennas capable of transmitting and/or receiving communication signals using one or more wireless communication technologies as described above with reference to FIG. 1. In some embodiments, computing device device 104 may include a generic RF receiver operative to monitor and scan multiple commonly used frequencies to detect the presence and electronic signature of multiple mobile computing devices 202-a. Also, in some examples, devices 202-a may include arrays similar to those of station device 104. The arrays may include one or more antennas capable of transmitting and/or receiving communication signals via a given wireless communication technology. For example, each of devices 202-a may include wireless transceivers capable of sending/receiving cellular RF signals 204, WLAN RF signals 206 and/or Bluetooth® RF signals 208. The embodiments are not limited in this respect.

In various embodiments, computing device 104 may be operative to passively receive the plurality of RF signals 204-k, 206-l and 208-m. For example, rather than requesting or receiving the RF signals in association with a connection request, the computing device 104 may instead simply monitor and scan multiple commonly used frequencies to detect RF signals being emitted, broadcast, etc. by one or more mobile computing devices 202-a. Because multiple RF signals 204-k, 206-l and 208-m may be received from multiple mobile computing devices 202-a at any given time, it may be difficult to identify which RF signals 204-k, 206-l and 208-m correspond to a respective mobile computing device 202-a. For example, if two mobile computing devices are in close proximity to one another, it may be difficult for computing device 104 to differentiate between the RF signals 204-k, 206-l and 208-m being output by each device. As a result, radio fingerprinting logic 110 may include or comprise an algorithm to identify and correlate RF signals 204-k, 206-l and 208-m to a mobile computing device 202-a over time based on historical data, comparisons of received data to known data, location information, and/or any other suitable factor or criteria. Other embodiments are described and claimed.

In one embodiment, radio fingerprinting logic 110 of computing device 104 may be operative to receive a set of radio frequency signals from multiple mobile computing devices at a first time. For example, the mobile computing devices 202-a shown in FIG. 2 may be within wireless range of computing device 104 at a first time such as on a first day while at a store controlling computing device 104 or in the morning while walking to work and passing by the location of computing device 104. At this first time, computing device 104 may receive one or more of RF signals 204-k, 206-l and 208-m from mobile computing devices 202-a.

In various embodiments, computing device 104 may store identification information for the set of radio frequency signals based on the received RF signals 204-k, 206-l and 208-m. For example, the computing device 104 may receive two cellular RF signals and two WLAN RF signals. The WLAN RF signals may contain a static MAC address that the computing device 104 may store in database 102 as identification information. The cellular RF signals my also contain identification information, however, this information may be dynamic (e.g. temporary). Despite the temporary nature of this identification information, the computing device 104 may store it in database 102. As part of the storing, computing device 104 may mark each of the received RF signals 204-*k*, 206-*l* and 208-*m* as having a potential correlation to one of the mobile computing devices 202-*a*. Absent additional information, it may be difficult to correlate the RF signals 204-*k*, 206-*l* and 208-*m* to a given mobile computing device 202-*a*, but the computing device 104 will continue to listen for additional information that may allow for further identification of the RF signals 204-*k*, 206-*l* and 208-*m*.

Computing device 104 may receive a subset of the set of RF signals 204-*k*, 206-*l* and 208-*m* from the radios 116-*x* that are associated with one of the multiple mobile computing devices 202-*a* at a second time in some embodiments. For example, later in the day on the walk home from work or during another visit to the store in the examples above, mobile computing device 202-1 may be within wireless range of computing device 104 without the presence of another mobile computing device and/or without the presence of another mobile computing device that was previously present at the same time as mobile computing device 202-1. In this example, computing device 104 may again receive cellular RF signal 204-1 and WLAN RF signal 206-1. Because these signals were previously received together, the computing device 104 may assume that there is some connection between them. Additionally, while the cellular RF signal 204-1 and WLAN RF signal 206-1 were previously detected along with the cellular RF signal and WLAN RF signal from another device, because the signals from the other device are no longer present, the computing device 104 may associate identification information for the subset of radio frequency signals (e.g. cellular RF signal 204-1 and WLAN RF signal 206-1) to the one mobile computing device (e.g. 202-1).

Based on this correlation, the computing device 104 may generate a multi-point radio fingerprint for the one mobile computing device 202-1 based on the subset of radio frequency signals (e.g. cellular RF signal 204-1 and WLAN RF signal 206-1). In various embodiments, the multi-point radio fingerprint may comprise a generic identifier associated with the subset of radio frequency signals output by the one mobile computing device. For example, the computing device 104 may correlate temporary identification information for a first radio frequency signal of the subset of radio frequency signals (e.g. for cellular RF signal 204-1) with permanent identification information for a second radio frequency signal of the subset of radio frequency signals (e.g. for WLAN RF signal 204-2) to generate the multi-point radio fingerprint.

Computing device 104 may store the identification information for the RF signals 204-*k*, 206-*l*, and 208-*m* and/or the multi-point radio fingerprint in a radio fingerprint database 102 of the computing device 104 in some embodiments as shown in FIG. 2. While FIG. 2 shows only a single computing device 104 having a local database 102, it should be understood that the embodiments are not limited in this respect. Other embodiments are described and claimed, particularly with respect to FIGS. 3 and 4. In the embodiments shown in FIG. 2, it may be possible to determine a location of the one mobile computing device 202-1 based on signal strength information for one or more of the subset of radio frequency signals and a known location of the base station. Location identification, however, may be performed more accurately using the other systems described herein. Other embodiments are described and claimed.

In various embodiments, the first radio frequency signal may have a greater range than the second radio frequency signal. For example, as described elsewhere herein, the subset of radio frequency signals may comprise two or more different radio frequency technologies or standards including but not limited to a cellular radio frequency technology or standard, a wireless local area network (WLAN) technology or standard, a personal area network (PAN) technology or standard or a near field communication (NFC) technology or standard. In an example with the first RF signal comprising a cellular RF signal and the second RF signal comprising a WLAN, Bluetooth® or NFC RF signal, computing device 104 may detect the first RF signal from a much greater distance, allowing for an earlier or broader range identification, tracking, etc. of the mobile computing device if the first RF signal is part of a multi-point radio fingerprint.

Figure 3:
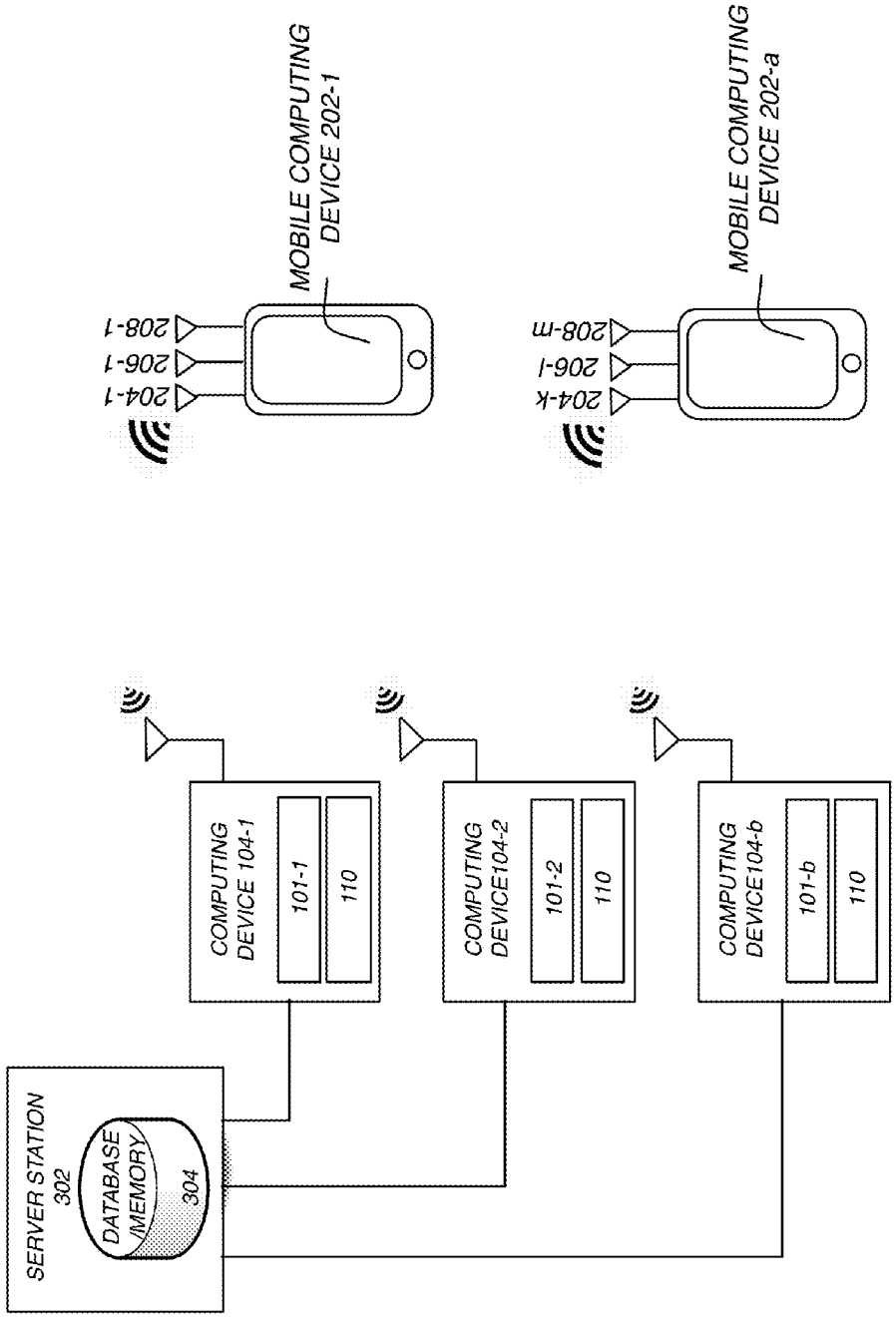
FIG. 3 illustrates an example block diagram for a second system.

FIG. 3 illustrates a system-level overview of an example system 300 for implementing radio fingerprinting. In various embodiments, the system 300 may be similar to system 200 of FIG. 2 but instead of only a single computing device 104 the system 300 may include multiple computing devices 104-*b* and two or more mobile computing devices 202-*a*. In one embodiment, the station devices 104-*b* may comprise separate base stations that form part of a network or otherwise communicate with a common server station 302 and each may be the same or similar to the computing device 104 of FIG. 1. As described above, the mobile computing devices 202-*a* may comprise any suitable mobile computing device having wireless communications capabilities including but not limited to two smartphone devices as shown.

In various embodiments, the receipt of the multiple RF signals 204-*k*, 206-*l* and 208-*m* may be the same for each of the computing devices 104-*b* as described above with reference to FIG. 2. Rather than storing the identification information and/or the multi-point radio fingerprint for the RF signals 204-*k*, 206-*l* and 208-*m* in a local database 102 at each computing device 104-*b*, the system 300 may include a centralized database 304 maintained at a server station 302 that is accessible by each of the computing devices 104-*b*. For example, each computing device 104-*b* may be operative to store the identification information or any other suitable information associated with a multi-point radio fingerprint in a shared radio fingerprint database 304 of a coordinating server station 302.

In various embodiments, the server station 302 may be the same or similar to any of the computing devices 104-*b*. For example, in one embodiment one of the computing devices 104-*b* may act as the server station in addition to acting as a computing device 104-*b*. In other embodiments, the server station 302 may comprise a server device specifically arranged to perform server coordination operations in connection with the generation and tracking of multi-point radio fingerprints. The embodiments are not limited in this respect.

In the multiple computing device context shown in FIG. 3, the location of each computing device may be known. All of the features of the single computing device system 200 may apply although device uniqueness using location is much more easily established using the system 300. In various embodiments, the multiple computing devices 104-*b* may be operative to detect radio fingerprints independently but may share the database 304 via coordinating server 302. Fingerprints detected by multiple computing devices 104-*b* may be resolved to more accurate locations by examining the precise arrival time of received signals and triangulating a position of the mobile computing device based on the position of the static devices 104-*b*. For example, one or more of the computing devices 104-*b* may be operative to receive arrival time information from the coordinating server station 302 to assist in determining the location or position of a mobile computing device. The arrival time information may comprise a time when the subset of radio frequency signals were received by multiple computing devices 104-*b*. In some embodiments, the one or more computing devices 104-*b* may determine a location of the one mobile computing device based on the arrival time information and a known location of two or more of the multiple base stations using known triangulation techniques. Other embodiments are described and claimed.

Figure 4:
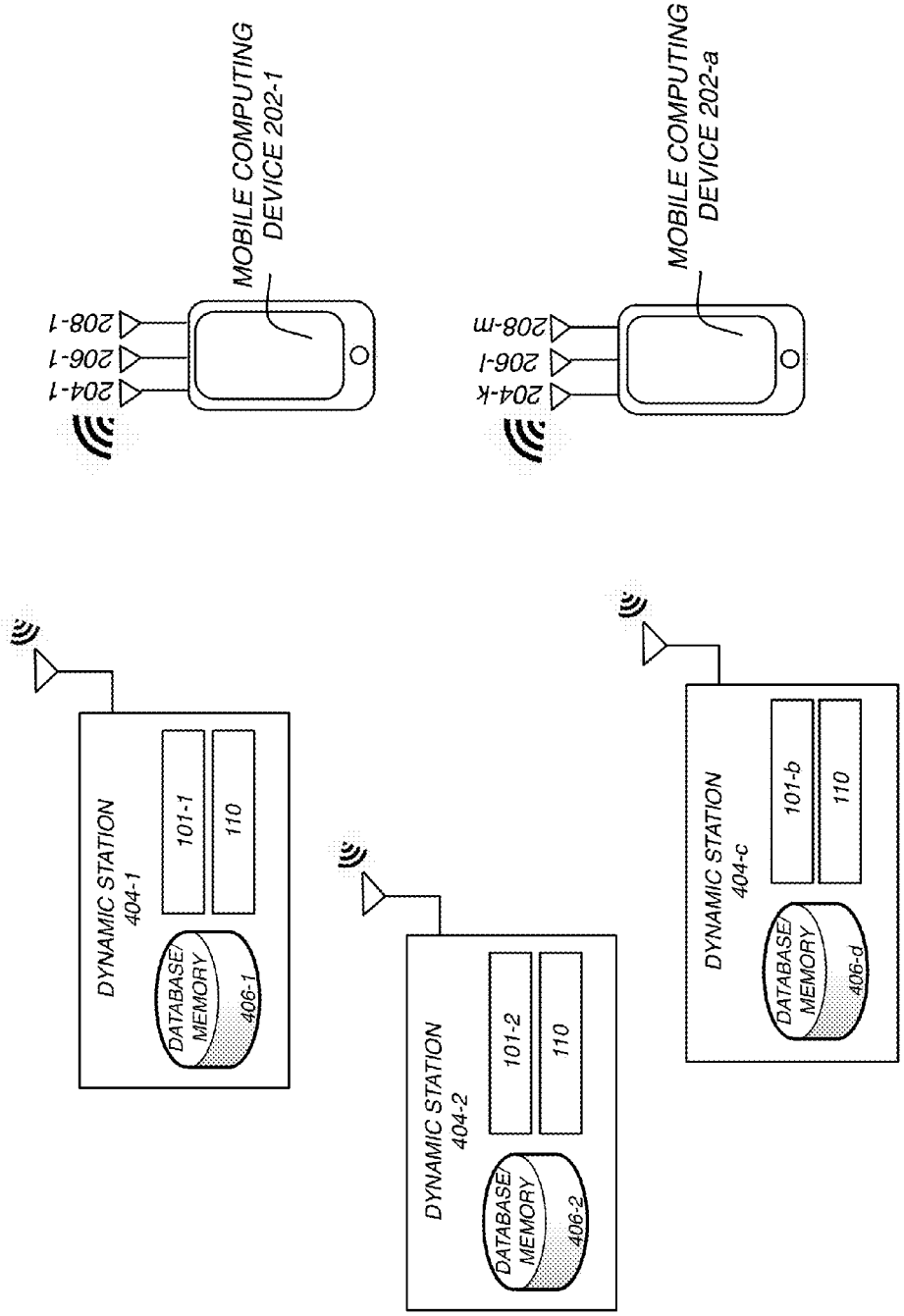
FIG. 4 illustrates an example block diagram for a third system.

FIG. 4 illustrates a system-level overview of an example system 400 for implementing radio fingerprinting. In various embodiments, the system 400 may be similar to systems 100 of FIG. 1 and 200 of FIG. 2 but instead of only a single computing device 104 or multiple computing devices 104-b, the system 400 may include multiple dynamic stations 404-c and two or more mobile computing devices 202-a. In one embodiment, the dynamic stations 404-c may comprise separate base stations that form part of a network or otherwise communicate with one another and each may be the same or similar to the computing device 104 of FIG. 1. However, the dynamic stations 404-c of system 400 may be capable of being moved or relocated rather than being stationary and/or static. As described above, the mobile computing devices 202-a may comprise any suitable mobile computing device having wireless communications capabilities including but not limited to two smartphone devices as shown.

The dynamic station 404-c infrastructure shown in FIG. 4 may function similarly to the multiple computing device infrastructure shown in FIG. 3 except that each dynamic station 404-c may be operative to maintain a distributed copy of the database 406-d and may periodically transmit a beacon to the other dynamic stations 404-c. In various embodiments, the dynamic stations 404-c may move over time so the periodic beacon may be used to update the location of each dynamic station 404-c over time. Each dynamic station 404-c may transmit a beacon comprising an update with timing information for the other dynamic stations. With this information, each dynamic station 404-c may be operative to determine the location of the other dynamic stations 404-c and hence the location of a mobile computing device 202-a in communication with one or more of the dynamic stations 404-c. In some embodiments, a radio fingerprint history, including location, location accuracy and identification tags making up each radio fingerprint may be accessed and processed by authorized systems. Optionally, one or more of the dynamic stations 404-c can forward fingerprint information to additional devices or systems interested in the data. The embodiments are not limited in this respect.

In various embodiments, any of the dynamic stations 404-c may be operative to store the multi-point radio fingerprint generated as described elsewhere herein in a radio fingerprint database of the respective dynamic station 404-c and to send updated location information for the dynamic station 404-c to one or more other dynamic stations 404-c. The dynamic station 404-c may also be operative to receive updated location information and/or signal strength information for the subset of radio frequency signals from the one or more other dynamic stations 404-c and to determine a location of the one mobile computing device based on a location of the dynamic station 404-c, a determined location of the one or more other dynamic stations 404-c and the received signal strength information. Other embodiments are described and claimed.

The embodiments described herein may be better understood with reference to the following examples that may comprise exemplary use case scenarios for any of the apparatus and/or systems described herein. These examples are provided for purposes of illustration and clarification and are not intended to be limiting. One skilled in the art will recognize that these examples represent only a few of many possible uses for the embodiments described herein.

One example use for radio fingerprinting as described herein may comprise a point-of-sale (POS) scenario where merchants may be able to track customers based on a radio fingerprint of a device controlled by the customer. For example, the merchant may be able to track an amount of time a wireless device spends shopping and perhaps a POS transaction. Subsequent detections of the device may trigger customer service behavior toward the owner of the device (e.g., enhanced customer service, greetings, welcome back, etc.) In addition, data associated with the multi-point radio fingerprint may be historically analyzed to determine the quality of that wireless device with respect to purchasing or browsing activity. For example, it may be possible to determine if the device spent most of its time in proximity to a particular product or section of a store or if the user of that device typically purchases a particular product.

In other POS scenarios, radio fingerprinting may be used to identify new versus repeat customers, identify where customers go in a store, and/or identify time spent in a store or in a particular section of a store. In various embodiments, radio fingerprinting may also be used in a POS scenario to count foot traffic outside a store, to test the effectiveness of displays both outside and inside a store, to identify when high value customers enter a store (to dispatch a representative, for example), to intelligently change an electronic advertisement based on the identity of the devices near it, and/or as a first step in a system designed to push offers to the mobile computing devices associated with the known multi-point radio fingerprints. The embodiments are not limited in this respect.

Radio fingerprinting as described herein may also be useful in security and surveillance scenarios. For example, in a crime/neighborhood watch scenario, devices may be tracked in a convenience store for example. If the convenience store is robbed, a log of all wireless devices in close proximity at the time of the robbery could lead to suspects and/or witnesses. The devices may then be tracked to see where they show up next provided a network of passive receivers exists. In other embodiments a radio fingerprint may be useful to track/follow a suspicious mobile device, to identify when a particular mobile device starts moving, and/or to identify when a particular mobile device leaves or enters a specific area. From a surveillance perspective, radio fingerprinting may be use to identify possible issues when one mobile device gets too close to another mobile device typically carried by someone with a restraining order against the owner of the other mobile computing device and/or to tie a mobile computing device to other security information such as a video of a perpetrator.

In an office scenario, radio fingerprinting as described herein may be useful for the detection of a known wireless device that may trigger a multitude of activities. For example, commands may be sent to boot the computer of the person associated with the mobile computing device upon entry into the office so as to be ready when he/she sits down. In other embodiments, the user's status may be updated on an office-wide LAN to indicate presence in the building based on detection of a radio fingerprint associated with a device under their control. In still other embodiments calls intended for a mobile device of a user may be routed to another device, such as to a desk or office phone, based on a proximity of the two devices.

Radio fingerprinting as described herein may be useful for counting in various embodiments. For example, for large outdoor events, different groups may be tasked with estimating the total number of people that are present in a given area. Radio fingerprinting may allow these groups to obtain far more accurate numbers and potentially distinguish between participants and onlookers. In some embodiments, multiple radio fingerprint implementations may be tied together to track fingerprints across a much larger space. For example, a global radio fingerprint registry may be implemented to make all radio fingerprinting implementations more accurate by removing ambiguity and identifying spoofing attempts and when tied to other data sources these implementations may be much more useful in solving their individual problems. Other embodiments are described and claimed.

As described in more detail with reference to FIGS. 9 to 13, in various embodiments it may be advantageous to associate a multi-point radio fingerprint generated as described herein with other data. For example, a multi-point radio fingerprint may be associated with a device value generated based on information about a mobile computing device derived from information contained in one or more RF signals received from the mobile computing device in order to sort, classify, or otherwise monitor the mobile computing device. The embodiments are not limited in this respect.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
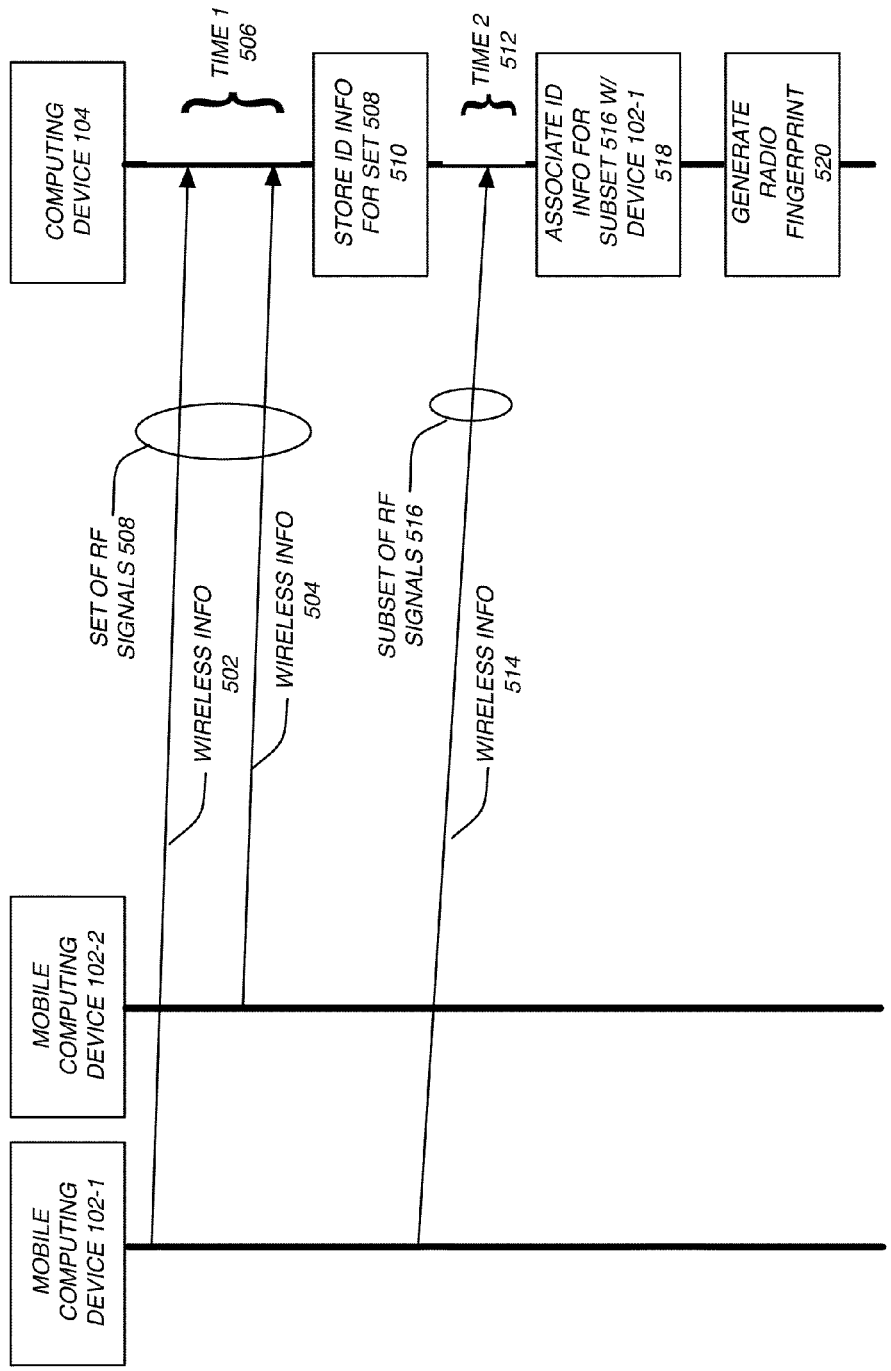
FIG. 5 illustrates an example of a first logic flow.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as any devices or systems described above with references to FIGS. 1-4 for example. More particularly, logic flow 500 may be implemented by radio fingerprinting logic 110 of a station device 104, 104-b and/or 404-c in some embodiments. Other embodiments are described and claimed.

In the illustrated example shown in FIG. 5, logic flow 500 may comprise a signal diagram illustrating the steps involved in generating a multi-point radio fingerprint as described elsewhere herein. While the embodiments shown in FIG. 5 include two mobile computing devices 102-a and a single computing device 104 (e.g. computing device 104), it should be understood that similar steps to those shown in FIG. 5 may be applicable to other systems described elsewhere herein. As such, the embodiments are not limited to the number, type, order or arrangement of steps shown in FIG. 5.

As shown in FIG. 5, mobile computing device 102-1 may transmit wireless information 502 that may be received by computing device 104 at time 1 506. The wireless information 502 may comprise multiple RF signals in some embodiments such as a cellular RF signal, a WLAN RF signal, a Bluetooth® RF signal and/or a NFC RF signal all of which may originate from mobile computing device 102-1. Similarly, mobile computing device 102-2 may transmit wireless information 504 that may also be received by computing device 104 at time 1 506. The wireless information 504 may comprise multiple RF signals in some embodiments such as a cellular RF signal, a WLAN RF signal, a Bluetooth® RF signal and/or a NFC RF signal all of which may originate from mobile computing device 102-2. Receipt of wireless information 502 and 504, which together may comprise a set of RF signals 508, at time 1 506 may make it difficult to determine which RF signals corresponds to which device 102-1 or 102-2. However, the computing device 104 may store identification information found in the wireless information 502/504 at 510. At a subsequent time 2 512, that is different than time 1 506, computing device 104 may receive wireless information 514 from mobile computing device 102-1. In some embodiments, this wireless information 514 may comprise a subset 516 of the set 508. For example, computing device 104 may determine that the subset of RF signals 516 may comprise only the RF signals originating from mobile computing device 102-1 because only one device (e.g. mobile computing device 102-1) is detected, etc. Based on this determination, the computing device 104 may associate the identification information for the subset of RF signals 516 to the mobile computing device 102-1 at 518 and may generate a multi-point radio fingerprint based on this information at 520. Other embodiments are described and claimed.

Figure 6:
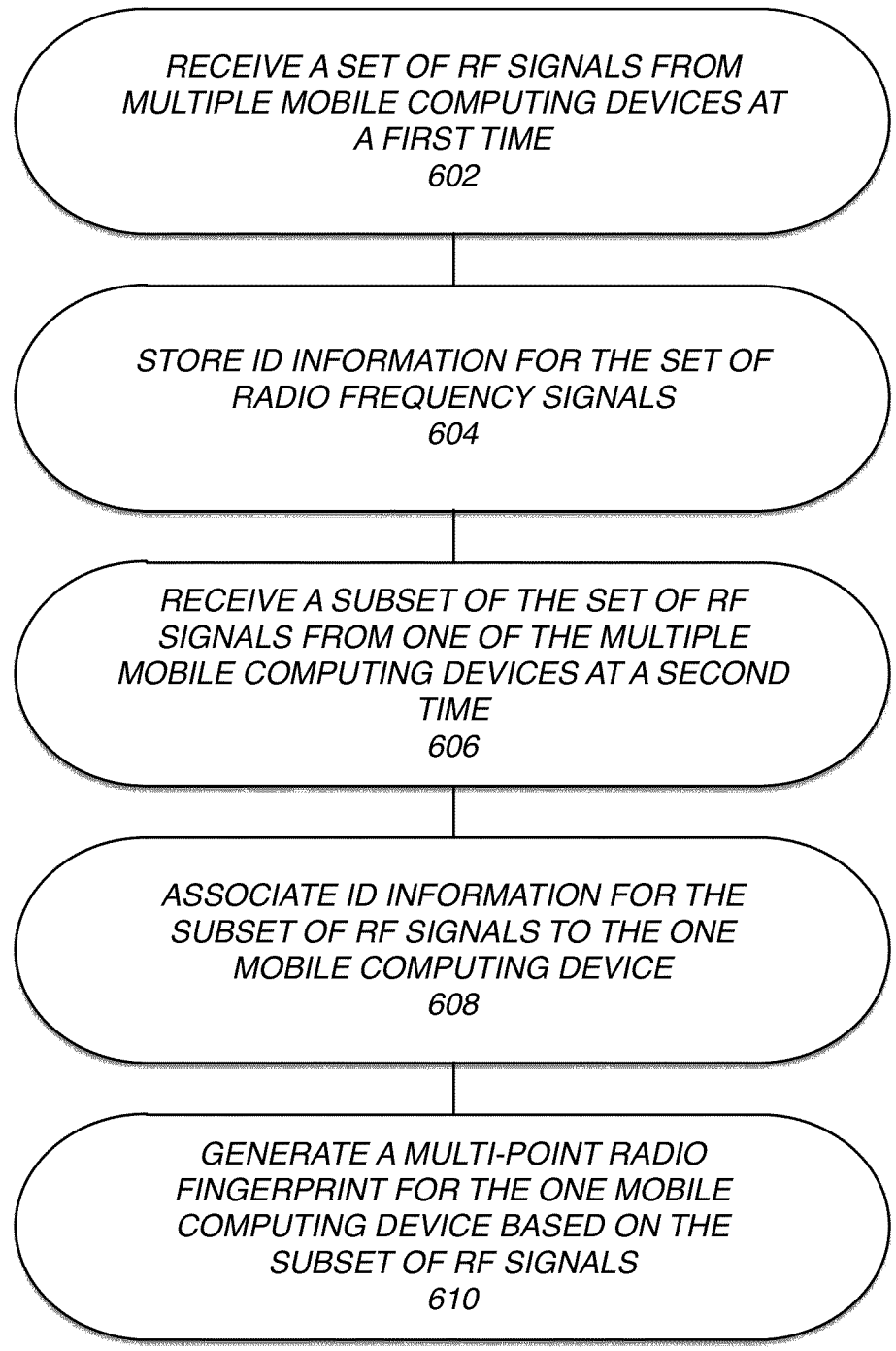
FIG. 6 illustrates an example of a second logic flow.

FIG. 6 illustrates an example of a second logic flow. As shown in FIG. 6, the second logic flow includes a logic flow 600. Logic flow 600 may be representative of some or all of the operations executed by one or more logic, features, or devices described herein, such as any devices described above with references to FIGS. 1-4 for example. More particularly, logic flow 600 may be implemented by radio fingerprinting logic 110 of a computing device 104, 104-b, 404-c in some embodiments. Other embodiments are described and claimed.

In the illustrated example shown in FIG. 6, the logic flow may include receiving a set of radio frequency signals from multiple mobile computing devices at a first time at 602. For example, computing device 104 may receive a set of RF signals comprising any number of RF signals 204-k, 206-l, and/or 208-m from mobile computing devices 202-a. At 604 the logic flow may include storing identification information for the set of radio frequency signals. For example, computing device 104 may store identification information for the set of RF signals in a local database or in a centralized database.

In various embodiments, the logic flow may include receiving a subset of the set of radio frequency signals from the radios 116-x that are associated with one of the multiple mobile computing devices at a second time at 606. For example, computing device 104 may receive only the RF signals 204-1, 206-1 and 208-1 from one or more of the radios of mobile computing device 102-1 at a second time that is different than the first time. At 608 the logic flow may include associating identification information for the subset of radio frequency signals to the one mobile computing device. For example, because the computing device 104 determines that the RF signals 204-1, 206-1 and 208-1 continue to show up in the presence of mobile computing device 202-1, computing device 104 may assume that these RF signals are originating from that device. At 610 the logic flow may include generating a multi-point radio fingerprint for the one mobile computing device based on the subset of radio frequency signals. The embodiments are not limited in this respect.

Figure 7:
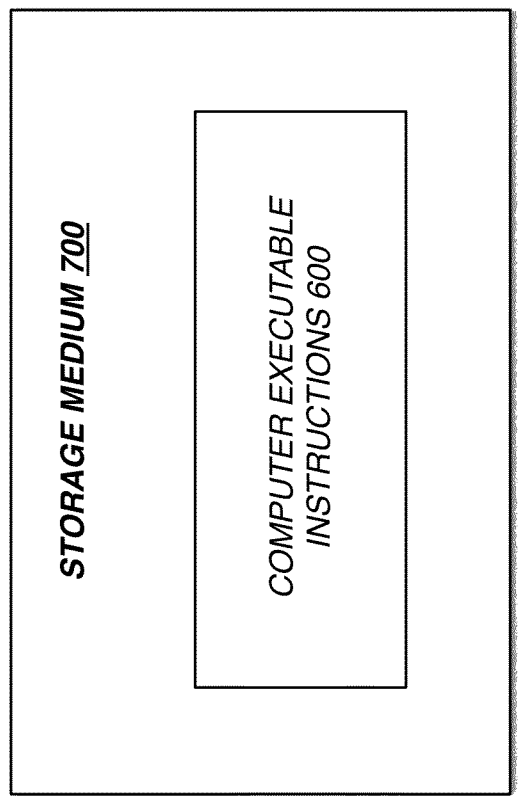
FIG. 7 illustrates an example of a first storage medium.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine-readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
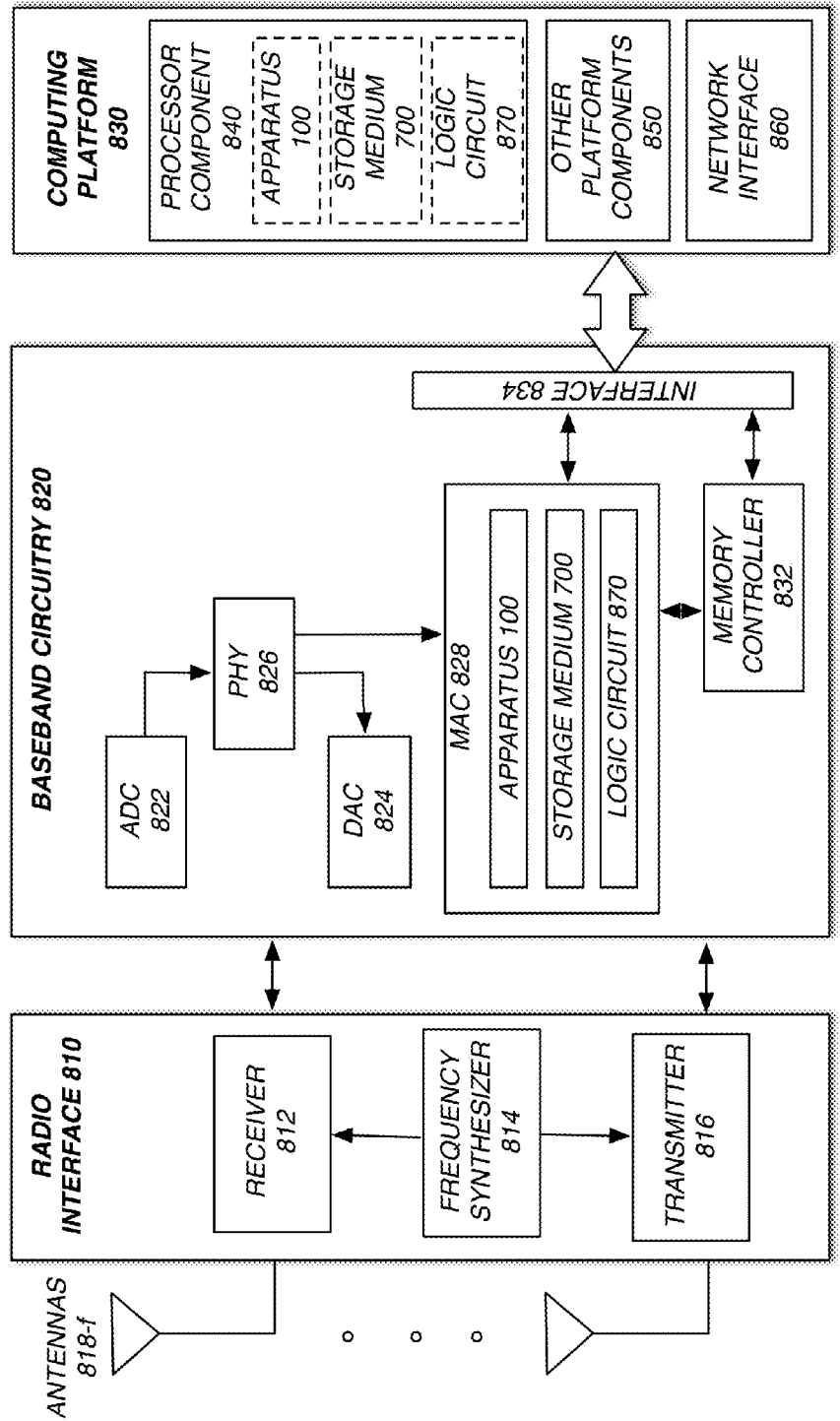
FIG. 8 illustrates an example of a device.

FIG. 8 illustrates an embodiment of a device 800. In some examples, device 800 may be configured or arranged for wireless communications in a wireless network. Device 800 may implement, for example, apparatus 100 and/or storage medium 700. The logic circuit 870 may include physical circuits to perform operations described for apparatus 100. As shown in FIG. 8, device 800 may include a radio interface 810, baseband circuitry 820, and computing platform 830, although examples are not limited to this configuration.

The device 800 may implement some or all of the structure and/or operations for apparatus 100, storage medium 700 and/or logic circuit 870 in a single computing entity, such as entirely within a single device. The embodiments are not limited in this context.

Radio interface 810 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-*f*. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with MAC processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames (e.g., containing subframes). Alternatively or in addition, MAC processing circuit 828 may share processing for certain of these functions or perform these processes independent of PHY processing circuit 826. In some embodiments, MAC and PHY processing may be integrated into a single circuit.

Computing platform 830 may provide computing functionality for device 800. As shown, computing platform 830 may include a processing component 840. In addition to, or alternatively of, baseband circuitry 820 of device 800 may execute processing operations or logic for apparatus 200/300, storage medium 800/900, and logic circuit 870 using the processing component 830. Processing component 840 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuit 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 830 may further include a network interface 860. In some examples, network interface 860 may include logic and/or features to support network interfaces operated in compliance with one or more wireless broadband technologies such as those described in one or more standards associated with IEEE 802.11 such as IEEE 802.11ad.

Device 800 may be, for example, user equipment, a computer, a personal computer (PC), a desktop computer, a laptop computer, a notebook computer, a netbook computer, a tablet computer, an ultrabook computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 800 described herein, may be included or omitted in various embodiments of device 800, as suitably desired. In some embodiments, device 800 may be configured to be compatible with protocols and frequencies associated with IEEE 802.11 Standards for WLANs and/or for wireless docking, although the examples are not limited in this respect.

Embodiments of device 800 may be implemented using single input single output (SISO) antenna architectures. However, certain implementations may include multiple antennas (e.g., antennas 818-*f*) for transmission and/or reception using adaptive antenna techniques for beamforming or spatial division multiple access (SDMA) and/or using multiple input multiple output (MIMO) communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
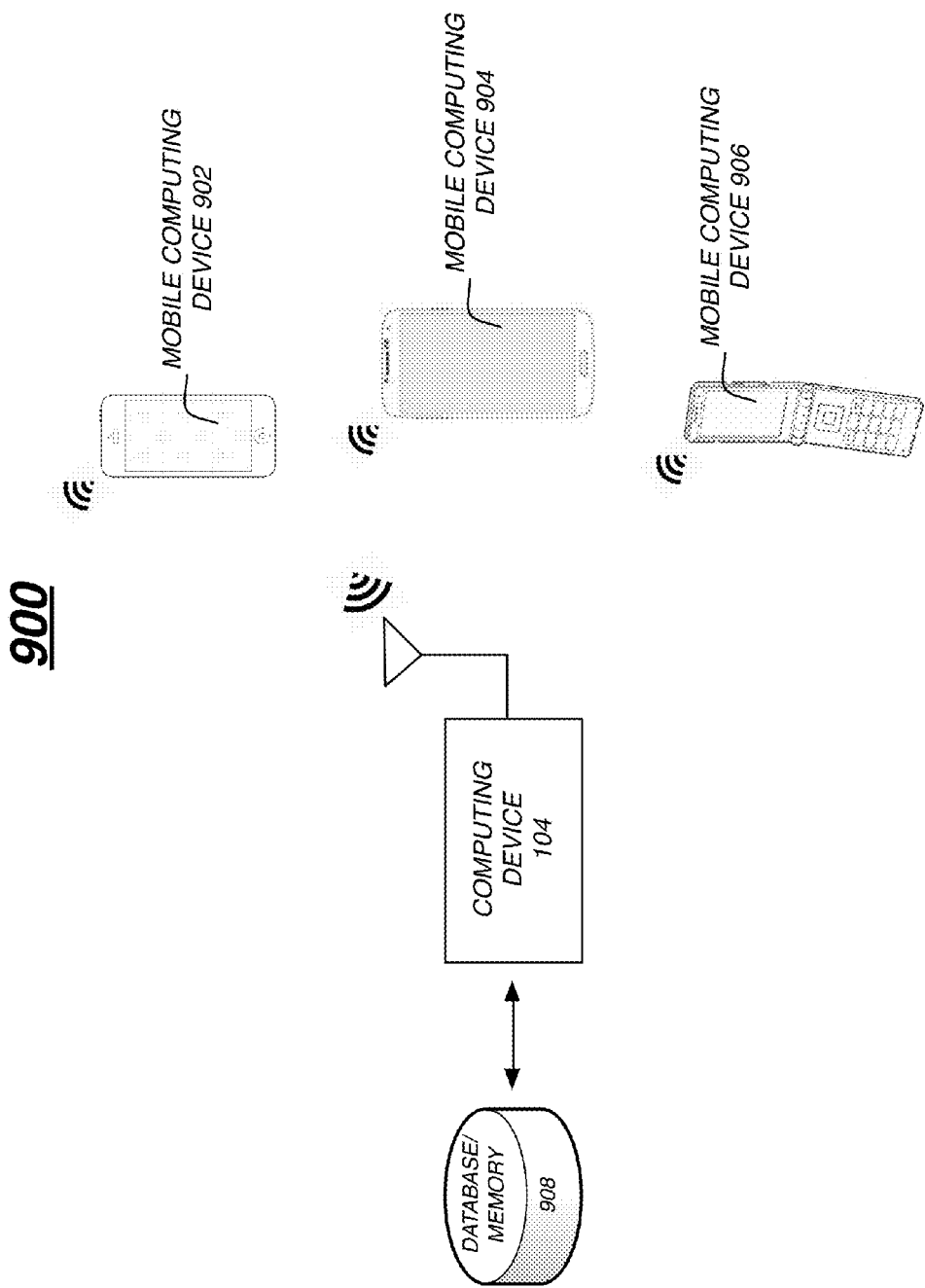
FIG. 9 illustrates an example block diagram for a fourth system.

FIG. 9 illustrates a system-level overview of a fourth example system 900 for implementing radio fingerprinting and associated device identification, valuation and other actions. In various embodiments, the system 900 may include a single computing device 104, one or more mobile computing devices 902, 904 and 906 and a database/memory 908. In one embodiment, the station device 104 may comprise a base station and may be the same or similar to the computing device 104 of FIG. 1, including radio fingerprinting logic 110 (not shown). The mobile computing devices 902, 904 and 906 may comprise any suitable mobile computing device having wireless communications capabilities including but not limited to three smartphone devices as shown in FIG. 9. While shown as being separate from computing device 104 in FIG. 9, database/memory 908 may be part of computing device 104 or located in any other suitable location or as part of any other device and still fall within the described embodiments.

While not described in detail with respect to FIG. 9, it should be understood that generation of a multi-point radio fingerprint for each of mobile computing devices 902, 904 and 906 may be performed using a same or similar technique as described herein. For example, radio fingerprinting logic 110 may be executed by a processor component to generate a multi-point radio fingerprint for a mobile computing device (e.g. 902, 904, 906) wherein the multi-point radio fingerprint comprising a generic identifier associated with a set of radio frequency signals output by the mobile computing device.

In some embodiments, generation of the multi-point radio fingerprint may comprise passively receiving multiple radio frequency signals from multiple mobile computing devices at a first time. For example, computing devices 902, 904 and 906 may each be within range of computing device 104 at a first time and each may include multiple radios. Information from each of the multiple radios of computing devices 902, 904 and 906 may include identification information for the multiple radio frequency signals and multiple mobile computing devices 902, 904 and 906 that is stored by computing device 104. At a second time, later than the first time, computing device 104 may receive a set of radio frequency signals from one of the mobile computing devices 902, 904 and 906 and may associate identification information for the set of radio frequency signals to the one mobile computing device 902, 904 and 906. Based on this information, the radio fingerprinting logic 110 may generate the multi-point radio fingerprint for the one mobile computing device. This process may be repeated over any number of different times for any number of devices such that over time a multi-point radio fingerprint is generated for multiple mobile computing devices.

Upon establishing a multi-point radio fingerprint for a mobile computing device, it may be advantageous to associate the multi-point radio fingerprint with other data. For example, a multi-point radio fingerprint may be associated with a device value generated based on information about a mobile computing device derived from information contained in one or more RF signals received from the mobile computing device in order to sort, classify, or otherwise monitor the mobile computing device. The embodiments are not limited in this respect.

In various embodiments it may be advantageous to identify devices with information in addition to a multi-point radio fingerprint. For example, it may be advantageous to calculate a device value for a device such as one or more of mobile computing devices 902, 904 and 906. A device value may comprise a calculated value, score and/or category assigned to a device based on an algorithm that gives different weight to different attributes of the device. For example, some manufacturers may be given more weight in the algorithm than others. Likewise, different models from a same manufacturer may be given different weight. In various embodiments, the radio fingerprinting logic may calculate the device value based on device information comprising one or more of manufacturer information, model information or time of activation information for the mobile computing device determined based on the identification information.

It should be understood that the device value may be calculated in any number of different ways using any combination of device attributes and the embodiments are not limited to any particular calculation of device value. For example, the calculation of device value may be made based on predefined algorithm established by a device manufacturer, a retailer or a user of a computing device in some embodiments. In other embodiments, the device value algorithm may be controlled and/or adjusted by a user or automatically over time to suit a particular use case. For example, a retailer may track statistics related to device value and actual sales data over time and may manually or automatically adjust the device value algorithm to accommodate for any statistical anomalies, irregularities and/or patterns.

To calculate the device value, computing device 104 may extract identification information from one or more of the set of radio frequency signals received from a mobile computing device 902, 904 or 906. For example, the identification information may comprise a media access control (MAC) address for the one or more radio frequency signals contained in a Bluetooth® or a WLAN RF signal. While not present in a cellular RF signal, correlating the device value and the multi-point radio fingerprint may allow for future device value identification using a corresponding cellular RF signal. This correlation may allow for device value identification over a larger geographic area due to the increased range of cellular RF signals when compared to Bluetooth® and WLAN RF signals. For example, a retailer may be able to determine that a high value device is approaching from a greater distance based on the cellular RF signal associated with that device because the cellular RF signal corresponds to device information derived from the WLAN RF signal and Bluetooth® RF signal of that device and associated with a multi-point radio fingerprint for that device.

Using the extracted identification information, radio fingerprinting logic 110 may be operative to receive device information from an internal database/memory, an external database/memory 908, a server or from any other suitable location. For example, radio fingerprinting logic 110 may receive the device information from a web or Internet server that contains identification information for all known devices that use particular chipsets, radios and the like. While it is possible to receive the device information based on information from one RF signal, utilizing information from multiple RF signals may increase the accuracy of the identification. For example, rather than simply relying on the MAC address from the WLAN RF signal, radio fingerprinting logic 110 may be operative to utilize both the MAC address from the WLAN RF signal and the MAC address from the Bluetooth® RF signal and may check multiple sources to confirm or increase the accuracy of the identification information. The embodiments are not limited in this respect.

Once the device information has been received, radio fingerprinting logic 110 may be operative to calculate the device value using the device information and one or more predetermined characteristics associated with the received information. For example, the device value may comprise a simple category designation in some embodiments such as high value, medium value or low value. In these embodiments, a high value device may comprise, for example, an iPhone 5S® from Apple, Inc.®, a Galaxy S4® from Samsung®, or any other suitable device, the user of which has perceived or potential value to an intended audience such as a retailer. A medium value device may comprise older models from these manufacturers such as an iPhone 4® and low value devices may comprise simple feature phones and the like. Other embodiments are described and claimed.

In other embodiments, a device value may comprise a score, such as on a scale from 0-100 based on any number of factors. For example, different manufacturers and different models may be assigned different point values that, when combined with other information that is included in the calculation such as time of device activation, etc., may together form the device value. An example table illustrating multiple device values is shown in FIG. 10.

FIG. 10 illustrates an example of a table and/or sample database entries representing device characteristics and device values 1000. In various embodiments, the entries shown in FIG. 10 may correspond to device information received from a device information database and device values calculated based on the device information. While a limited number, type and arrangement of information is shown for purposes of illustration, the embodiments are not limited in this respect.

The device information shown in FIG. 10 includes, in the first three columns of the table respectively, manufacturer information, model information and activation information. The manufacturer information may comprise the company that manufacturers the device. The model information may comprise a model of the device and the activation information may comprise the year the device was activated. In some embodiments, a known ranking of manufacturers and models may be used to calculate the device value. Additionally, newer activation information may also be scored more highly in terms of device value than older activation information. For example, the Apple® iPhone 5S® activated in 2013 may be a very high value device and may receive a device value of 100. This may because statistical data illustrates that users of this device tend to spend money on certain products, etc. The second device in the table, the Samsung® Galaxy S4® activated in 2013, may receive a score of 90. While also a high value device, data may show that users of this device may spend less money that users of the foregoing Apple® device. Similar data is shown for other devices in the table 1000 of FIG. 10 and other embodiments are described and claimed.

In various embodiments, the radio fingerprinting logic 110 may be operative to compare the device information for a mobile computing device to device values for multiple other mobile computing devices and sort the mobile computing device and the multiple other mobile computing devices based on the device values. For example, if device information for a new device is calculated that results in a device value of 80, this device may be inserted into the table 1000 between the Motorola® Moto X® and the Samsung® Galaxy S4®. Once calculated, the device value may be assigned to the mobile computing device based on the device information and this device value may be correlated with the multi-point radio fingerprint for use based on detection of any one or more of the radio signals associated with that multi-point radio fingerprint.

Figure 11:
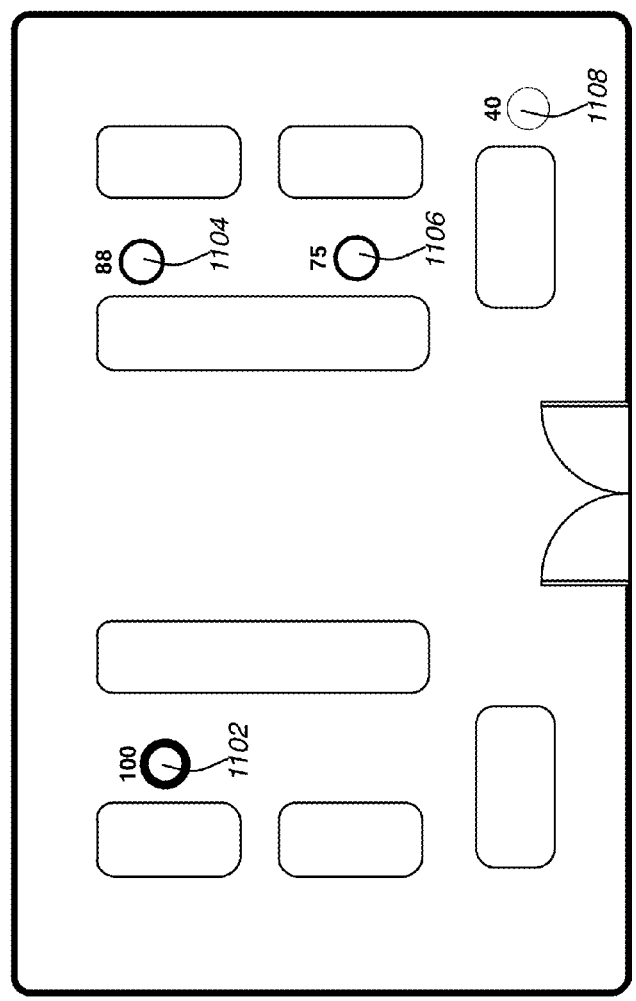
FIG. 11 illustrates an example block diagram of a graphical user interface.

FIG. 11 illustrates an example block diagram of a graphical user interface 1100. For example, the graphical user interface 1100 of FIG. 11 represents one example of a use case scenario for device tracking based on multi-point radio fingerprints and display of device value. In one embodiment the graphical user interface 1100 includes a display of data used to track multiple mobile computing devices and illustrate device values for the multiple mobile computing devices. As shown in FIG. 11, in some embodiments, the radio fingerprinting logic 110 may be operative to generate a graphical representation of one or more mobile computing devices 1102, 1104, 1106 and 1108 for display on a display device, the graphical representation including the device value.

The embodiment shown in FIG. 11 may comprise, for example, a floor plan of a typical store. In this example, an owner of the store may be able to track the different devices as they move throughout the store as described elsewhere herein. Additionally, the graphical display 1100 may include one or more details that illustrate device value. For example, the high value device 1102 may have a device value of 100 that may be displayed along with a representation of the device and the representation may be shown in a more bold manner, a different color, etc. indicating that this is a high value device. In contrast, the lesser-valued devices 1104 having a device value of 88 and 1106 having a device value of 75 may be shown in a manner that signifies that these are lower priority devices, while device 1108 having a device value of 40 may be shown as a low priority device.

Using the above-described example graphical user interface 1100, a real time map of shoppers and their activities may be shown and tracked which may allow for the gathering of important information including but not limited to how many trips a user makes to a store, if a user continues to frequent a particular area in the store, how long users spend in particular area, etc. This information may then be used to influence store layouts and/or product placements, to prompt a sales associate to give attention to a high priority device/shopper and to otherwise track and analyze trends and other data. In other embodiments, radio fingerprinting logic 110 may communicate with point of sale equipment to link purchase data to the multi-point radio fingerprint and device value. The embodiments are not limited in this respect.

FIG. 12 illustrates an example of a third logic flow. As shown in FIG. 12, the third logic flow includes a logic flow 1200. Logic flow 1200 may be representative of some or all of the operations executed by one or more logic, features, or devices described herein, such as any devices or systems described above with references to FIGS. 1-11 for example. More particularly, logic flow 1200 may be implemented by radio fingerprinting logic 110 of a station device 104, 104-b and/or 404-c in some embodiments. Other embodiments are described and claimed.

In the illustrated example shown in FIG. 12, logic flow 1200 may comprise a signal diagram illustrating the steps involved in associating a multi-point radio fingerprint generated as described elsewhere herein and a device value. As shown in FIG. 12, a multi-point radio fingerprint may be generated for a mobile computing device at 1202. In various embodiments, the multi-point radio fingerprint may comprise a generic identifier associated with a set of radio frequency signals output by a mobile computing device. At 1204, device information for the mobile computing device may be received based on identification information contained in one or more of the set of radio frequency signals. For example, radio fingerprinting logic 110 may use a MAC address of a Bluetooth® RF signal and a WLAN RF signal received from a mobile computing device to request information from an information server which may return identification information about the device to the computing device 104.

In some embodiments, a device value may be calculated based on the identification information and this value may be assigned to the mobile computing device at 1206. For example, the device value may comprise a calculated value, score and/or category assigned to a device based on an algorithm that gives different weight to different attributes of the device. This device value may be assigned to or correlated with the multi-point radio fingerprint at 1208. For example, the device value may be associated with the multi-point radio fingerprint such that detection of any of the RF signals associated with the multi-point radio fingerprint may result in retrieval of the device value. In this manner, the device value may be available over a larger geographic area due to the range of cellular RF signals and may be available when certain radios are turned off for a particular device (e.g. cellular and Bluetooth® radios are turned off, but WLAN radio is turned on). Other embodiments are described and claimed.

FIG. 13 illustrates an embodiment of a second storage medium. As shown in FIG. 13, the second storage medium includes a storage medium 1300. Storage medium 1300 may comprise an article of manufacture. In some examples, storage medium 1300 may include any non-transitory computer readable medium or machine-readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. At least one non-transitory machine-readable medium comprising a set of instructions that in response to being executed on a computing device cause the computing device to:

generate a multi-point radio fingerprint for a mobile computing device, the multi-point radio fingerprint comprising a generic identifier associated with a set of radio frequency signals output by the mobile computing device;

receive device information for the mobile computing device based on identification information contained in one or more of the set of radio frequency signals;

assign a device value to the mobile computing device based on the device information; and correlate the device value and the multi-point radio fingerprint.

2. The at least one machine-readable medium of claim 1, the device information comprising one or more of manufacturer information, model information or time of activation information for the mobile computing device determined based on the identification information.

3. The at least one machine-readable medium of claim 2, the identification information comprising a media access control (MAC) address for the one or more radio frequency signals.

4. The at least one machine-readable medium of claim 1, the set of radio frequency signals comprising two or more different radio frequency technologies or standards.

5. The at least one machine-readable medium of claim 1, comprising instructions that in response to being executed on the computing device cause the computing device to:
   compare the device value for the mobile computing device to device values for multiple other mobile computing devices; and
   sort the mobile computing device and the multiple other mobile computing devices based on the device values.

6. The at least one machine-readable medium of claim 1, comprising instructions that in response to being executed on the computing device cause the computing device to generate a graphical representation of the mobile computing device for display on a display device, the graphical representation including the device value.

7. The at least one machine-readable medium of claim 1, comprising instructions that in response to being executed on the computing device cause the computing device to:
   passively receive multiple radio frequency signals from multiple mobile computing devices at a first time;
   store identification information for the multiple radio frequency signals and multiple mobile computing devices;
   receive the set of radio frequency signals from the mobile computing device at a second time;
   associate identification information for the set of radio frequency signals to the mobile computing device; and
   generate the multi-point radio fingerprint for the mobile computing device based on the set of radio frequency signals.

8. The at least one machine-readable medium of claim 1, comprising instructions that in response to being executed on the computing device cause the computing device to correlate temporary identification information for a first radio frequency signal of the set of radio frequency signals with permanent identification information for a second radio frequency signal of the subset of radio frequency signals to generate the multi-point radio fingerprint.

9. The at least one machine-readable medium of claim 8, the first radio frequency signal having a greater range than the second radio frequency signal.

10. An apparatus, comprising:
    a processor component;
    at least one RF receiver component to passively receive a set of radio frequency signals from multiple mobile computing devices; and
    radio fingerprinting logic to be executed by the processor component to generate a multi-point radio fingerprint for a mobile computing device, the multi-point radio fingerprint comprising a generic identifier associated with a set of radio frequency signals output by the mobile computing device, receive device information for the mobile computing device based on identification information contained in one or more of the set of radio frequency signals, assign a device value to the mobile computing device based on the device information, and correlate the device value and the multi-point radio fingerprint.

11. The apparatus of claim 10, the at least one RF receiver component comprising a Software Defined Radio (SDR).

12. The apparatus of claim 10, the device information comprising one or more of manufacturer information, model information or time of activation information for the mobile computing device determined based on the identification information.

13. The apparatus of claim 12, the identification information comprising a media access control (MAC) address for the one or more radio frequency signals.

14. The apparatus of claim 10, the set of radio frequency signals comprising two or more different radio frequency technologies or standards.

15. The apparatus of claim 10, the radio fingerprinting logic to compare the device value for the mobile computing device to device values for multiple other mobile computing devices and sort the mobile computing device and the multiple other mobile computing devices based on the device values.

16. The apparatus of claim 10, the radio fingerprinting logic to generate a graphical representation of the mobile computing device for display on a display device, the graphical representation including the device value.

17. The apparatus of claim 10, the radio fingerprinting logic to:
    passively receive multiple radio frequency signals from multiple mobile computing devices at a first time;
    store identification information for the multiple radio frequency signals and multiple mobile computing devices;
    receive the set of radio frequency signals from the mobile computing device at a second time;
    associate identification information for the set of radio frequency signals to the mobile computing device; and
    generate the multi-point radio fingerprint for the mobile computing device based on the set of radio frequency signals.

18. The apparatus of claim 10, the radio fingerprinting logic to correlate temporary identification information for a first radio frequency signal of the set of radio frequency signals with permanent identification information for a second radio frequency signal of the subset of radio frequency signals to generate the multi-point radio fingerprint.

19. The apparatus of claim 18, the first radio frequency signal having a greater range than the second radio frequency signal.

20. A system, comprising:
    a processor component;
    memory coupled to the processor component;
    one or more passive radio receivers coupled to the processor component;
    one or more antennas coupled to the one or more radios; and
    radio fingerprinting logic to be executed by the processor component to generate a multi-point radio fingerprint for a mobile computing device, the multi-point radio fingerprint comprising a generic identifier associated with a set of radio frequency signals output by the mobile computing device, receive device information for the mobile computing device based on identification information contained in one or more of the set of radio frequency signals, assign a device value to the mobile computing device based on the device information, and correlate the device value and the multi-point radio fingerprint.

21. The system of claim 20, the one or more passive radio receivers comprising a Software Defined Radio (SDR).

22. The system of claim 20, the device information comprising one or more of manufacturer information, model information or time of activation information for the mobile computing device determined based on the identification information.

23. The system of claim 22, the identification information comprising a media access control (MAC) address for the one or more radio frequency signals.

24. The system of claim 20, the set of radio frequency signals comprising two or more different radio frequency technologies or standards.

25. The system of claim 20, the radio fingerprinting logic to compare the device value for the mobile computing device to device values for multiple other mobile computing devices and sort the mobile computing device and the multiple other mobile computing devices based on the device values.

26. The system of claim 20, the radio fingerprinting logic to generate a graphical representation of the mobile computing device for display on a display device, the graphical representation including the device value.

27. The system of claim 20, the radio fingerprinting logic to:
 passively receive multiple radio frequency signals from multiple mobile computing devices at a first time;
 store identification information for the multiple radio frequency signals and multiple mobile computing devices;
 receive the set of radio frequency signals from the mobile computing device at a second time;
 associate identification information for the set of radio frequency signals to the mobile computing device; and
 generate the multi-point radio fingerprint for the mobile computing device based on the set of radio frequency signals.

28. The system of claim 20, the radio fingerprinting logic to correlate temporary identification information for a first radio frequency signal of the set of radio frequency signals with permanent identification information for a second radio frequency signal of the subset of radio frequency signals to generate the multi-point radio fingerprint.

29. The system of claim 28, the first radio frequency signal having a greater range than the second radio frequency signal.

* * * * *